US010583841B2

(12) United States Patent
Emura et al.

(10) Patent No.: US 10,583,841 B2
(45) Date of Patent: Mar. 10, 2020

(54) DRIVING SUPPORT METHOD, DATA PROCESSOR USING THE SAME, AND DRIVING SUPPORT SYSTEM USING THE SAME

(71) Applicant: Panasonic Intellectual Property Management Co., Ltd., Osaka (JP)

(72) Inventors: Koichi Emura, Kanagawa (JP); Hideto Motomura, Kyoto (JP); Sahim Kourkouss, Osaka (JP); Masanaga Tsuji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/922,713

(22) Filed: Mar. 15, 2018

(65) Prior Publication Data
US 2018/0281813 A1 Oct. 4, 2018

(30) Foreign Application Priority Data

Mar. 31, 2017 (JP) ................... 2017-071471

(51) Int. Cl.
*B60W 40/09* (2012.01)
*B60W 50/08* (2020.01)
*G05D 1/00* (2006.01)
*B60W 50/02* (2012.01)
*B60W 40/10* (2012.01)
*B60W 50/00* (2006.01)

(52) U.S. Cl.
CPC ............ *B60W 40/09* (2013.01); *B60W 40/10* (2013.01); *B60W 50/0205* (2013.01); *B60W 50/0225* (2013.01); *B60W 50/085* (2013.01); *G05D 1/0088* (2013.01); *B60W 2050/0029* (2013.01); *B60W 2050/0089* (2013.01); *B60W 2050/0215* (2013.01)

(58) Field of Classification Search
CPC .... G05D 1/0088; B60W 40/09; B60W 40/10; B60W 50/0205; B60W 50/0225; B60W 50/085; B60W 2050/0029; B60W 2050/0089; B60W 2050/0215
USPC ........................................................ 701/27
See application file for complete search history.

(56) References Cited

U.S. PATENT DOCUMENTS

| 8,265,834 B2* | 9/2012 | Inoue .............. | B62D 15/027 340/435 |
| 2015/0006132 A1* | 1/2015 | Matsumura ......... | G08G 1/0112 703/2 |

FOREIGN PATENT DOCUMENTS

| JP | 2009-237937 A | 10/2009 |
| WO | WO-2014023570 A1 * | 2/2014 |

* cited by examiner

*Primary Examiner* — Anthony R Jimenez
(74) *Attorney, Agent, or Firm* — Seed IP Law Group LLP

(57) ABSTRACT

A driving support device as an example of a data processor executes processing for estimating a driving behavior of a vehicle by using a driving behavior model trained based on detection results by a sensor. A detected-information input unit acquires detected information including the detection results. From the detection results included in the detected information input to the detected-information input unit, a selection unit selects a detection result that falls within predetermined selection range narrower than a range detectable by the sensor. A processing unit executes the processing, based on the detection result selected by the selection unit.

16 Claims, 14 Drawing Sheets

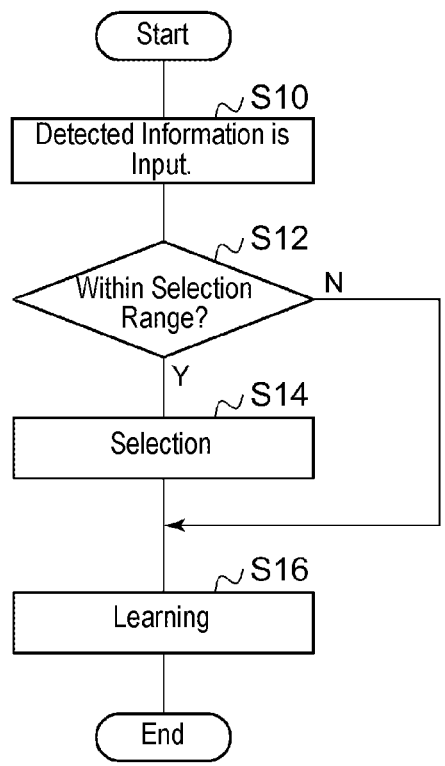
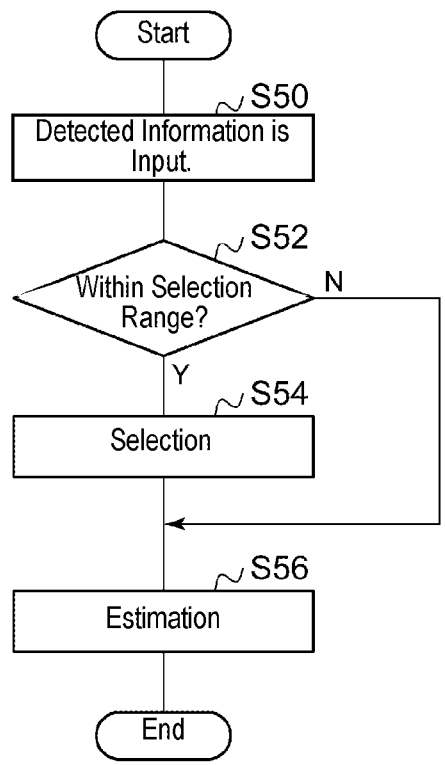

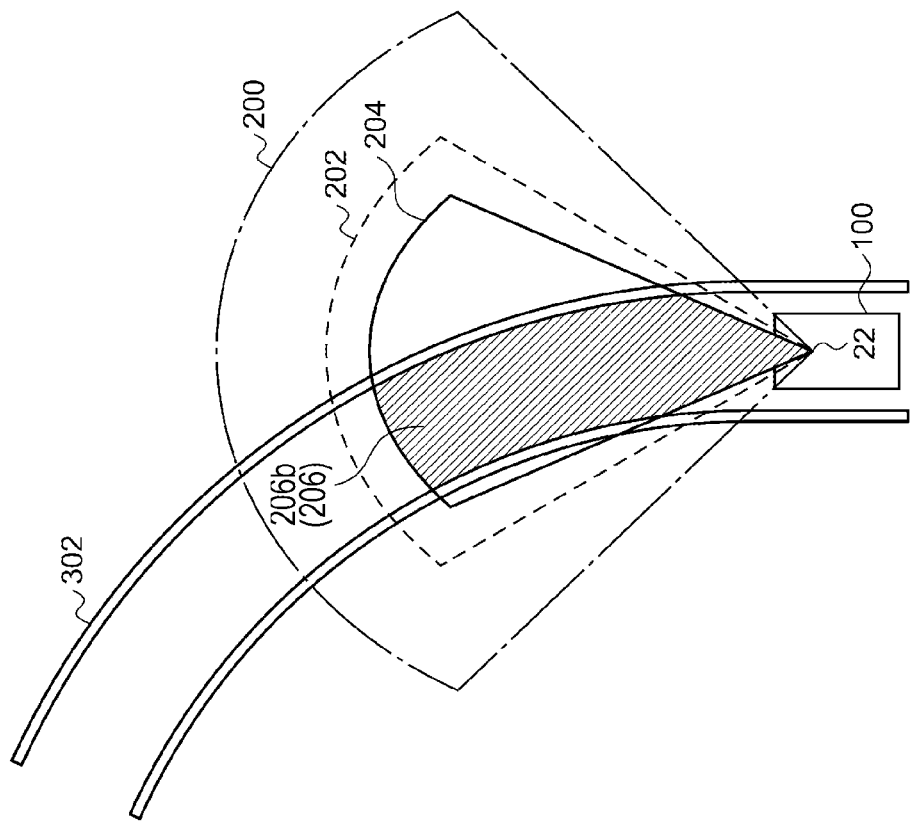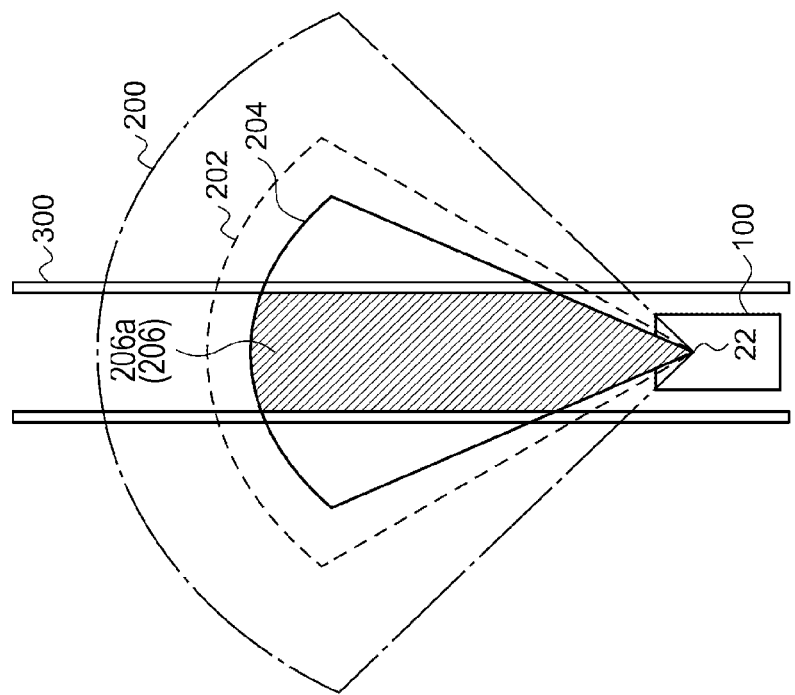

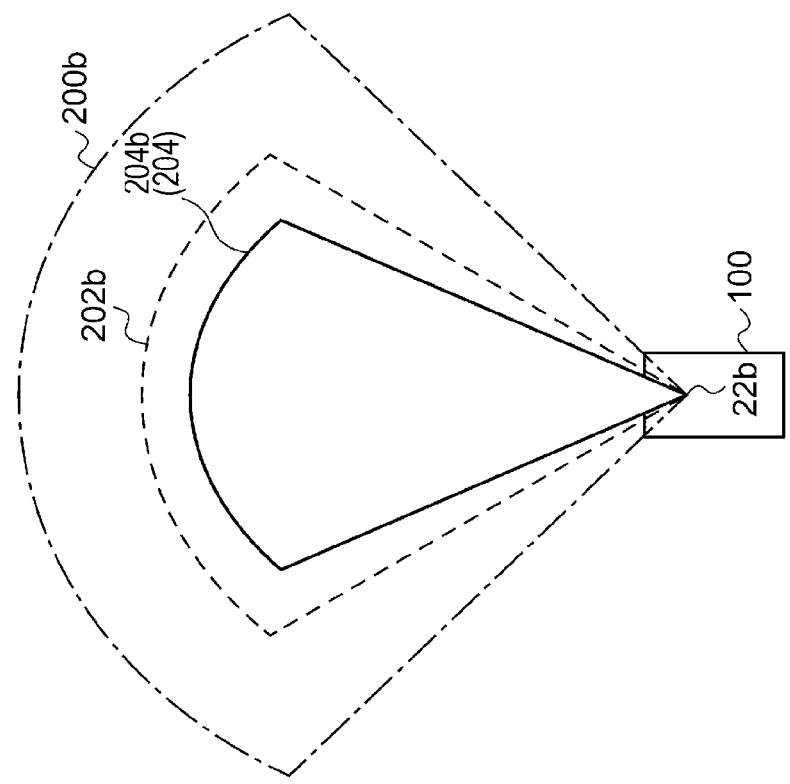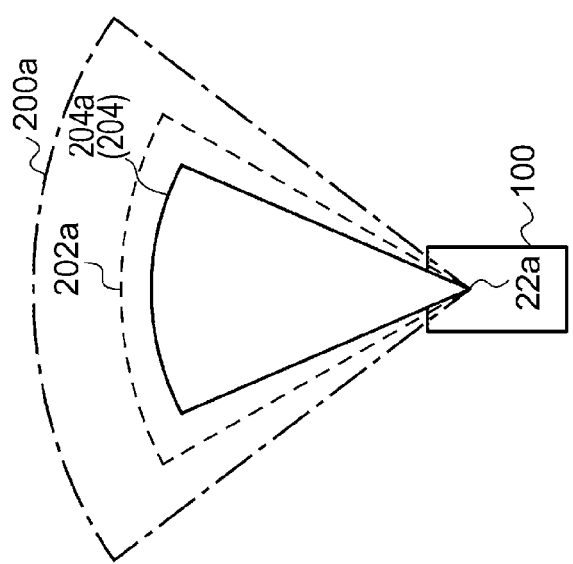

DRIVING SUPPORT METHOD, DATA PROCESSOR USING THE SAME, AND DRIVING SUPPORT SYSTEM USING THE SAME

BACKGROUND

1. Technical Field

The present disclosure relates to a vehicle, a driving support method applied to the vehicle, a data processor and a driving support system both using the driving support method.

2. Description of the Related Art

Driving operations by a driver are supported using data obtained by sensing, for example, driving behaviors. For example, measurement data is input as a parameter to a driver model, and the driver model outputs a subsequent operation (for example, refer to Japanese Unexamined Patent Application Publication No. 2009-237937).

SUMMARY

The present disclosure provides a technique for reducing the influence of a decrease in the detection accuracy of a sensor.

A data processor according to one aspect of the present disclosure executes processing for estimating a driving behavior of a vehicle by using a driving behavior model trained based on the result of detection by a sensor. This data processor includes a detected-information input unit, a selection unit, and a processing unit. The detected-information input unit acquires detected information including the detection results. From the detection results included in the detected information acquired by the detected-information input unit, the selection unit selects a detection result that falls within a predetermined selection range narrower than a range detectable by the sensor. The processing unit executes the processing based on the detection result selected by the selection unit.

Another aspect of the present disclosure is a driving support method. This method is configured to execute processing for estimating a driving behavior of a vehicle by using a driving behavior model trained based on detection results by a sensor. In this method, detected information including the detection results is input to a computer. Subsequently, from the detection results included in the input detected information, a detection result is selected. The selected detection result falls within a predetermined selection range narrower than a range detectable by the sensor. Furthermore, based on the selected detection result, the processing is executed.

Further another aspect of the present disclosure is a driving support system. This driving support system includes a storage configured to store a sensor profile, and a data processor. The data processor acquires the sensor profile from the storage, and executes processing for estimating a driving behavior of a vehicle by using a driving behavior model trained based on the result of detection by a sensor. The data processor is configured as described above. The selection unit of the data processor acquires the selection range from the sensor profile.

Note that, as aspects of the present disclosure, also effective are: an arbitrary combination of the above-mentioned constituents; some of the constituents; a configuration, for example, to execute processes for reinforcement learning unit sequentially or every predetermined time such as every day by using a computer through a communications network; and what is obtained by replacing a representation of the present disclosure with a device, a system, a method, a program, a recording medium with a program recorded therein, or a vehicle mounted with the present device.

According to the present disclosures, the influence of a decrease in the detection accuracy of a sensor can be reduced.

BRIEF DESCRIPTION OF DRAWINGS

FIG. 8 is a flowchart illustrating a procedure of learning by the driving support device according to the first to fourth exemplary embodiments.

FIG. 9 is a flowchart illustrating a procedure of estimation by the driving support device according to the first to fourth exemplary embodiments.

FIG. 11A and FIG. 11B are diagrams illustrating outlines of detection by a sensor according to the second exemplary embodiment.

FIG. 13A and FIG. 13B are diagrams illustrating outlines of detection by a sensor according to the third exemplary embodiment.

DETAILED DESCRIPTION OF PREFERRED EMBODIMENTS

Figure 1:
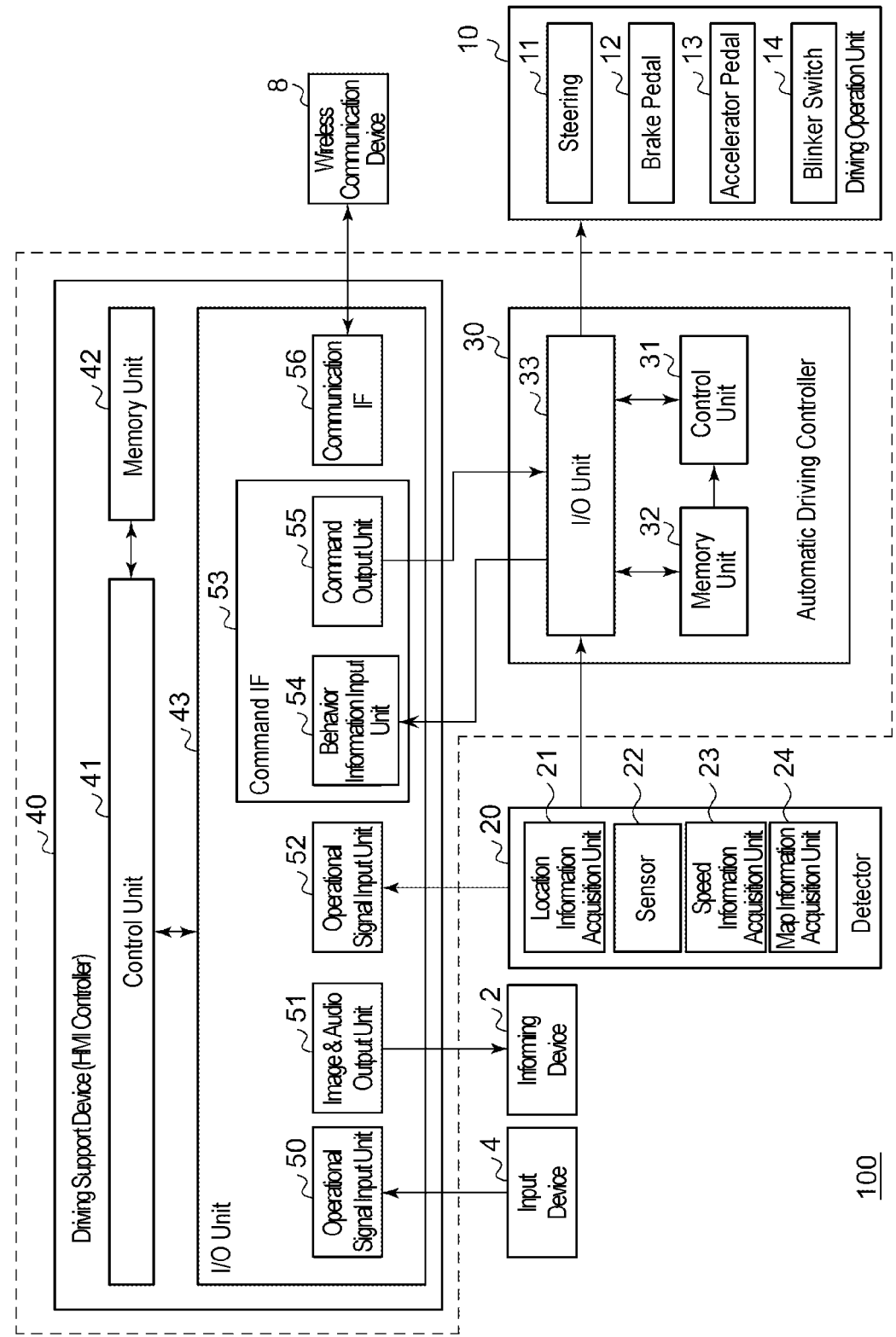
FIG. 1 is a diagram illustrating a configuration of a vehicle according to first to fourth exemplary embodiments.

Prior to the description of the embodiments of the present disclosure, problems involved with conventional arts are now briefly described.

Using the results of detection by a sensor mounted to a vehicle, the training of a driving behavior model and the estimation of a driving behavior are performed. As the condition in which such a sensor is used approaches its performance limits, erroneous detection and undetection more frequently occur. A driving behavior model trained using detection results including a larger amount of erroneous detection and undetection is less preferable. Furthermore, a driving behavior estimated using such driving behavior model is also less preferable.

Prior to the specific description of various embodiments of the present disclosure, the outline is described. The present disclosure relates to automatic driving of an automobile. In particular, the embodiments relate to a device (hereinafter, also referred to as a "data processor" or a "driving support device") for controlling a human machine interface (HMI) for exchanging information on a driving behavior of a vehicle with an occupant (such as a driver) in the vehicle. The driving support device executes at least one of the training of a driving behavior model for automatic driving (hereinafter, referred to as "learning processing") and the estimation of a driving behavior based on the driving behavior model (hereinafter, referred to as "estimation processing").

Terms used in the embodiment are defined as follows. "Driving behavior" includes operation states, such as steering and braking during running of or at the time of stop of a vehicle, and control contents related to automatic driving control, and examples thereof include constant-speed driving, acceleration, deceleration, temporary stopping, stopping, lane changing, course changing, right/left turn, and parking. Furthermore, examples of the driving behavior may include cruising (lane and speed keeping), lane keeping, the following of a vehicle having gone ahead, stop-and-go driving at the time of following, passing, response to merging vehicles, course change (interchange) including entering and leaving expressways, merging, response to construction zones, response to emergency vehicles, response to vehicle interruption, response to right/left turn lanes, interactions with pedestrians and bicycles, avoidance of obstacles other than vehicles, response to signs, response to right/left turn and U-turn restrictions, response to lane restrictions, response to one-way traffic, response to traffic-control signs, and response to intersections and roundabouts.

As a "driving behavior estimation engine", any one of, for example, deep learning (DL), machine learning (ML), and filtering is used, or two or more of them are used in combination. Examples of the deep learning include a convolutional neural network (CNN) and a recurrent neural network (RNN). Examples of the machine learning include a support vector machine (SVM). Examples of the filtering include collaborative filtering.

The "driving behavior model" is uniquely defined according to the driving behavior estimation engine. In the case of DL, the driving behavior model is a trained neural network. In the case of SVM, the driving behavior model is a trained prediction model. In the case of collaborative filtering, the driving behavior model is data obtained by associating running environment data with driving behavior data. In the case of a rule, the driving behavior model is data obtained by associating input with output.

Under such definitions, the driving support device serving as the data processor according to the present disclosure executes the learning processing by using detection results by a sensor and supervised data, and executes the estimation processing by using the detection results by the sensor and a driving behavior model. The detection accuracy of a sensor decreases as the condition in which the sensor is used approaches its detectable limit, and accordingly erroneous detection and undetection more frequently occur. When the sensor is used in such state, the influence of erroneous detection and undetection causes the trained driving behavior model to be less preferable, and also causes the estimated driving behavior to be less preferable, as described above. Therefore, to suppress such use of the sensor, a sensor manufacturer or a sensor seller generally defines a range in which the detection accuracy of a sensor satisfies a predetermined value as a performance specification range, and recommends the use of the sensor within the performance specification range. Here, the predetermined value is defined so that the probability that a detection result is correct is, for example, 90%. Furthermore, the performance specification range is defined so as to be narrower than the detectable range.

In the various embodiments to be described hereinafter, in order to reduce the influence of a decrease in the detection accuracy of a sensor, a selection range is defined so as to be narrower than the performance specification range. The driving support device executes the learning processing or the estimation processing by using only a detection result that falls within the selection range. Hereinafter, the embodiments of the present disclosure are described in detail with reference to the drawings. Note the embodiments described below are only examples, and the present disclosure is not limited to these embodiments.

First Exemplary Embodiment

FIG. 1 illustrates a configuration of vehicle 100, specifically a configuration of an automatic driving vehicle. Vehicle 100 is capable of running in automatic-driving mode, and includes informing device 2, input device 4, wireless communication device 8, driving operation unit 10, detector 20, automatic driving controller 30, and driving support device 40. These devices illustrated in FIG. 1 may be connected via a leased line or wire communication such as a controller area network (CAN). Alternatively, the devices may be connected via wire or wireless communication such as universal serial bus (USB), Ethernet (registered trademark), Wi-Fi (registered trademark), or Bluetooth (registered trademark).

Informing device 2 informs an occupant of information on the running of vehicle 100. Examples of informing device 2 include a car-navigation system, a head-up display, and a center display, which are installed inside the vehicle. Informing device 2 may be a display unit for displaying information, for example, an illuminant, such as a light emitting diode (LED), installed around a steering wheel, a pillar, a dashboard, or a meter panel. Alternatively, informing device 2 may be a loudspeaker capable of converting information into a sound to inform an occupant of the information, or may be a vibrating body provided in a portion in which an occupant can sense the vibration (for example, in an occupant's seat or a steering wheel). Alternatively, informing device 2 may be formed of a combination of them.

Input device 4 is a user interface device for receiving operation input from an occupant. Examples of input device 4 include controllers such as a touch panel, a lever, a button, a switch, a joystick, and a volume controller sensors such as a camera for recognizing gestures in a non-contact manner; sensors such as a microphone for recognizing sounds: and a combination of them. Input device 4 receives information on automatic driving of a vehicle, the information being input by an occupant thereof. Alternatively, input device 4 may receive an operation signal for switching between automatic driving and manual driving. Input device 4 outputs the received information as an operation signal to driving support device 40.

Figure 2:
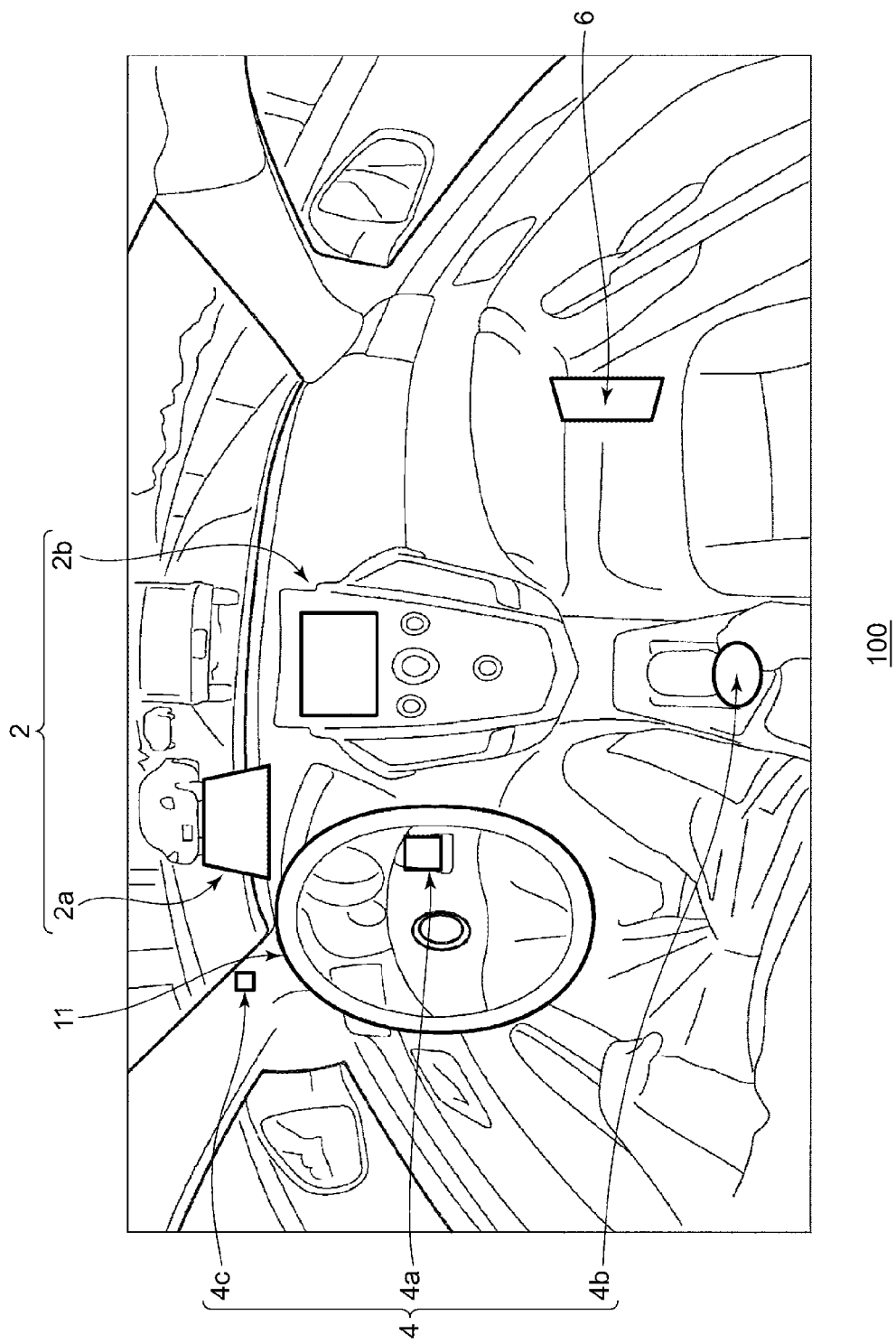
FIG. 2 is a diagram schematically illustrating the interior of the vehicle according to the first to fourth exemplary embodiments.

FIG. 2 schematically illustrates the interior of vehicle 100. Informing device 2 may be head-up display (HUD) 2a or center display 2b. Input device 4 may be first operation unit 4a provided in steering 11, second operation unit 4b provided between a driver's seat and a front passenger's seat, or third operation unit 4c as a sensor such as a camera for recognizing gestures. Note that informing device 2 and input device 4 may be integrated, and, for example, mounted as a touch-panel display. Vehicle 100 may be further provided with loudspeaker 6 for informing an occupant of information on automatic driving by a sound or voice. In this case, driving support device 40 may cause informing device 2 to display an image indicating the information on automatic driving, and in addition to this or instead of this, may cause loudspeaker 6 to output a sound indicating the information on automatic driving. The description will return referring to FIG. 1.

Wireless communication device 8 corresponds to, for example, a cellular phone communication system or a wireless metropolitan area network (WMAN), and executes wireless communications. Driving operation unit 10 includes steering 11, brake pedal 12, accelerator pedal 13, and blinker switch 14. Steering 11, brake pedal 12, accelerator pedal 13, and blinker switch 14 can be electronically controlled by a steering ECU, a brake ECU, an engine ECU, a motor ECU, and a blinker controller. In automatic driving mode, the steering ECU, the brake ECU, the engine ECU, and the motor ECU drive an actuator according to a control signal supplied from automatic driving controller 30. The blinker controller turns on or off a blinker according to a control signal supplied from automatic driving controller 30.

Detector 20 detects the circumference conditions and running state of vehicle 100. Detector 20 detects, for example, the speed of vehicle 100, the relative speed of a vehicle running ahead of vehicle 100 with respect to vehicle 100, the distance between vehicle 100 and the vehicle running ahead of vehicle 100, the relative speed of a vehicle in a lane adjacent to a lane of vehicle 100 with respect to vehicle 100, the distance between vehicle 100 and the vehicle in the lane adjacent to the lane of vehicle 100, and information on the location of vehicle 100. Detector 20 outputs detected various information (hereinafter, referred to as "detected information") to automatic driving controller 30. Alternatively, detector 20 may output detected information to driving support device 40 via automatic driving controller 30, or may output detected information directly to driving support device 40. Detector 20 includes location information acquisition unit 21, sensor 22, speed information acquisition unit 23, and map information acquisition unit 24.

Location information acquisition unit 21 acquires information on the present location of vehicle 100 from a global navigation satellite system(s) (GNSS) receiver. Sensor 22 is a general term for various sensors capable of detecting conditions outside vehicle 100 and the state of vehicle 100. As the sensor for detecting conditions outside the vehicle, for example, a camera, a millimeter-wave radar, light detection and ranging/laser imaging detection and ranging (LIDAR), a sonar, an atmospheric temperature sensor, an atmospheric pressure sensor, a humidity sensor, and an illuminance sensor are mounted. Examples of the conditions outside the vehicle include conditions of a road on which the vehicle is running, such as lane information, environment conditions including the weather, conditions surrounding the vehicle, and other vehicles in the vicinities of the vehicle (for example, other vehicles running in lanes adjacent to a lane in which the vehicle is running). Note that such information may be any information on conditions outside the vehicle that are detectable by sensor 22. As sensor 22 for detecting the state of vehicle 100, for example, an acceleration sensor, a gyro sensor, a geomagnetic sensor, and an inclinometer are mounted.

Speed information acquisition unit 23 acquires the present speed of vehicle 100 from a vehicle speed sensor. Map information acquisition unit 24 acquires map information on the area around the present location of vehicle 100 from a map database. The map database may be recorded on a recording medium in vehicle 100, or may be downloaded from a map server via a network when used. Note that the map information includes information on roads and intersections.

Automatic driving controller 30 implements an automatic operation control function, and determines the behavior of vehicle 100 in automatic driving. Automatic driving controller 30 includes control unit 31, memory unit 32, and input/output (I/O) unit 33. The configuration of control unit 31 can be implemented using a hardware resource and a software resource in cooperation, or using a hardware resource alone. As the hardware resource, a processor, a read only memory (ROM), a random access memory (RAM), and other LSI may be used. As the software resource, an operating system, an application, and a program such as firmware may be used. Memory unit 32 includes a nonvolatile recording medium, such as a flash memory. I/O unit 33 executes various types of communication control according to respective communication formats. For example, I/O unit 33 outputs information on automatic driving to driving support device 40, and receives a control command from driving support device 40. Furthermore, I/O unit 33 receives detected information from detector 20.

Control unit 31 applies the control command received from driving support device 40 and various information collected from detector 20 or various ECUs to an automatic driving algorithm to calculate control values for controlling automatic control targets, such as the degree of opening of an accelerator throttle of vehicle 100 and a steering angle thereof. Control unit 31 transmits the calculated control values to the ECUs or controllers for the control targets, respectively. In the present embodiment, the control values are transmitted to a steering ECU, a brake ECU, an engine ECU, and a blinker controller, respectively. Note that, in the case of an electric vehicle or a hybrid car, the control value is transmitted to a motor ECU, instead of or in addition to the engine ECU.

Driving support device 40 is an HMI controller capable of executing an interface function between vehicle 100 and an occupant, and includes control unit 41, memory unit 42, and I/O unit 43. Control unit 41 executes various types of data processing, such as HMI control. Control unit 41 can be implemented using a hardware resource and a software resource in cooperation, or using a hardware resource alone. As the hardware resource, a processor, a ROM, a RAM, and other LSI may be used. As the software resource, an operating system, an application, and a program such as firmware may be used.

Memory unit 42 stores data referred to or updated by control unit 41. Memory unit 42 is implemented, for example, by a nonvolatile recording medium, such as a flash memory. I/O unit 43 executes various types of communication control according to respective communication formats. I/O unit 43 includes operational signal input unit 50, image and audio output unit 51, detected-information input unit 52, command interface (IF) 53, and communication IF 56.

Operational signal input unit 50 receives, from input device 4, an operational signal produced when an occupant or a user outside the vehicle operates input device 4, and outputs the operational signal to control unit 41. Image and audio output unit 51 outputs image data or an audio message produced by control unit 41 to informing device 2 to display the image data or discharge the audio message. Detected-information input unit 52 receives, from detector 20, the detected information that is the result of detection processing by detector 20 and indicates the present circumference conditions and running state of vehicle 100, and outputs the detected information to control unit 41.

Command IF 53 executes interface processing with respect to automatic driving controller 30, and includes behavior information input unit 54 and command output unit 55. Behavior information input unit 54 receives the information on automatic driving of vehicle 100, and outputs the information to control unit 41. The information has been transmitted from automatic driving controller 30 to behavior information input unit 54. Command output unit 55 receives, from control unit 41, a control command that instructs automatic driving controller 30 on an automatic driving mode, and transmits the control command to automatic driving controller 30.

Communication IF 56 executes interface processing with respect to wireless communication device 8. Communication IF 56 transmits data output from control unit 41 to wireless communication device 8, and causes wireless communication device 8 to transmit the data device outside the vehicle. Furthermore, communication IF 56 receives data sent from the device outside the vehicle and transferred by wireless communication device 8, and outputs the data to control unit 41.

Note that, here, automatic driving controller 30 and driving support device 40 are configured as separate devices. As a modification, automatic driving controller 30 and driving support device 40 may be integrated into one controller, as illustrated with a dashed line in FIG. 1. In other words, one automatic driving controller may be configured to have both the functions of automatic driving controller 30 and driving support device 40 shown in FIG. 1.

Figure 3A:
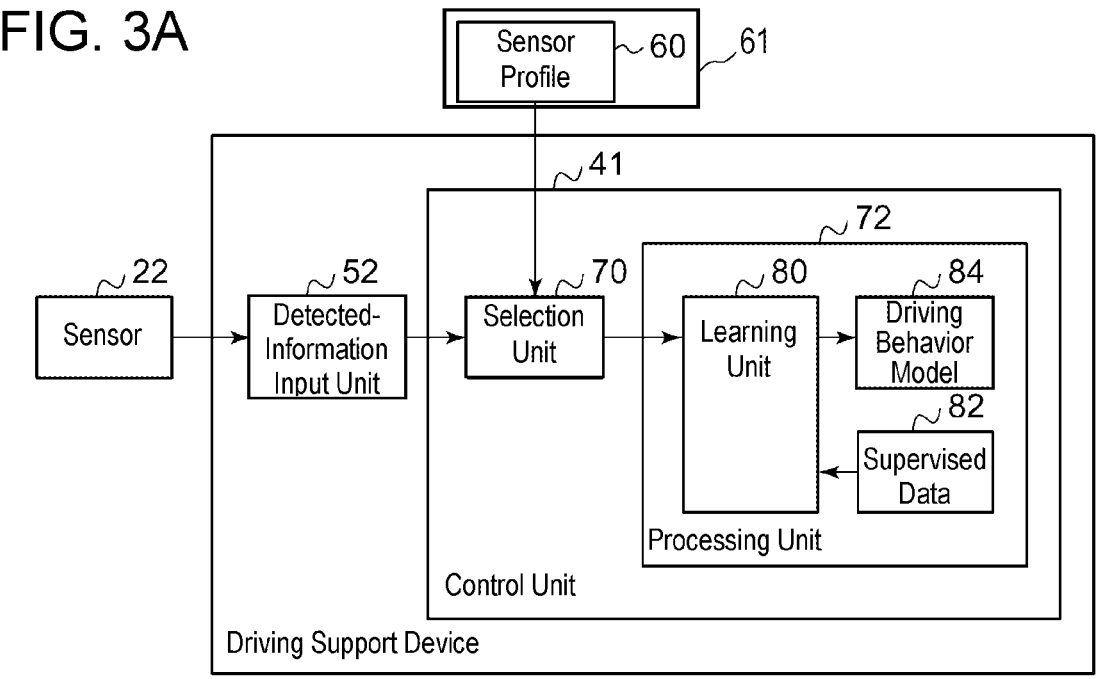
FIG. 3A and FIG. 3B are diagrams illustrating configurations of a driving support device according to the first to fourth exemplary embodiments.
Figure 3B:
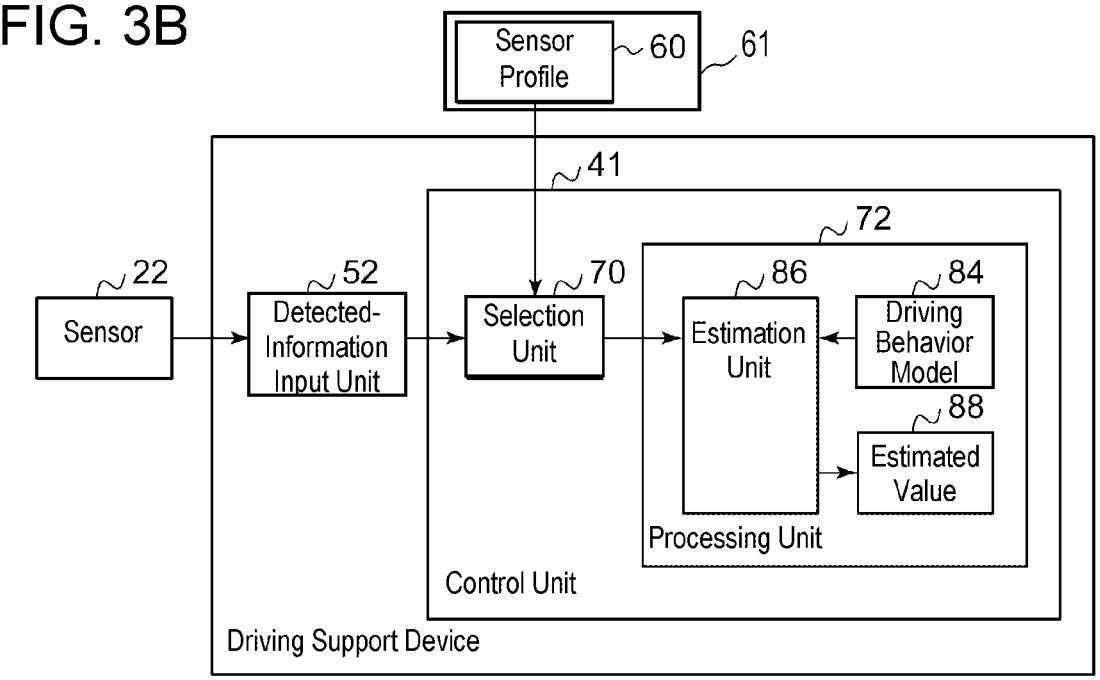

FIG. 3A and FIG. 3B illustrate configurations of driving support device 40. FIG. 3A illustrates a configuration related to learning processing, and FIG. 3B illustrates a configuration related to estimation processing. Here, the learning processing is described first, and subsequently, the estimation processing is described. In FIG. 3A, control unit 41 includes selection unit 70 and processing unit 72, and processing unit 72 includes learning unit 80, supervised data 82, and driving behavior model 84. Sensor 22 is connected to detected-information input unit 52, and detected-information input unit 52 is connected to selection unit 70.

Figure 4:
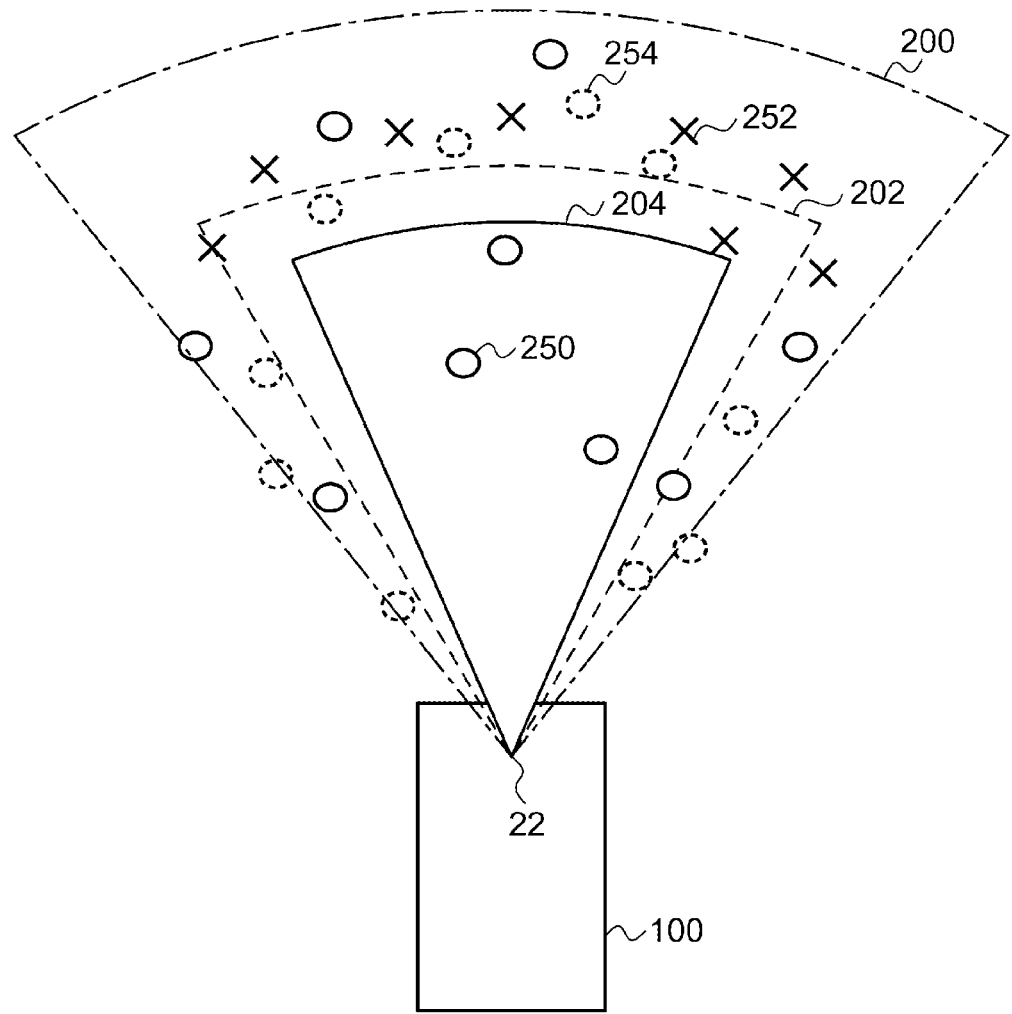
FIG. 4 is a diagram illustrating an outline of detection by a sensor according to the first to fourth exemplary embodiments.

As described above, examples of sensor 22 include a camera, a millimeter-wave radar, LIDAR, a sonar, an atmospheric temperature sensor, an atmospheric pressure sensor, a humidity sensor, and an illuminance sensor. Generally, a plurality of types of sensors 22 are mounted to vehicle 100, but, here, to make a description clear, only one sensor 22 is mounted on vehicle 100. FIG. 4 illustrates the outline of detection by sensor 22. Sensor 22 is capable of detecting an object such as obstacle present within detectable range 200. Correct detection result 250 denotes an object correctly detected by sensor 22, and erroneous detection result 252 denotes an object erroneously detected by sensor 22 although being not present in reality. Undetection 254 denotes an object not detected by sensor 22 although being present in reality. A higher ratio of correct detection result 250 indicates higher detection accuracy. In contrast, a higher ratio of erroneous detection result 252 and undetection 254 indicates lower detection accuracy.

As shown in FIG. 4, the ratio of erroneous detection result 252 and undetection 254 is higher in an area more distant from sensor 22 and closer to the boundary of detectable range 200. As described above, for the purpose of preventing the use of sensor 22 under a condition that causes a higher ratio of erroneous detection result 252 and undetection 254, a manufacturer or a seller of sensor 22 defines performance specification range 202. Performance specification range 202 is a range in which the detection accuracy of sensor 22 satisfies a predetermined value, and is defined so as to be narrower (smaller) than detectable range 200. That is, when detecting an object in performance specification range 202, sensor 22 attains detection accuracy enough to satisfy the predetermined value. Note that, when the type of sensor 22 is changed, the largeness of detectable range 200 and the largeness of performance specification range 202 change, accordingly. Furthermore, even in the case of using the same type of sensor 22, the largeness of detectable range 200 and the largeness of performance specification range 202 may change. The description will return referring to FIG. 3A.

To detected-information input unit 52, detected information from sensor 22 is input. The detected information includes detection result by sensor 22. The detection results indicate the distance to an object detected by sensor 22 and the direction of the object by using sensor 22 as the starting point. Detected-information input unit 52 outputs the detected information to selection unit 70. Selection unit 70 receives the detected information from detected-information input unit 52. Furthermore, selection unit 70 acquires, from sensor profile 60, a selection range to be compared with the detection results. As illustrated in FIG. 4, selection range 204 is defined to be narrower than performance specification range 202. In such selection range 204, the detection accuracy of sensor 22 is higher than that in performance specification range 202. The description will return referring to FIG. 3A. Selection unit 70 determines whether or not a location indicated by a distance and a direction in a detection result falls within selection range 204. Selection unit 70 selects a detection result that falls within selection range 204. Selection unit 70 outputs the selected detection result to learning unit 80.

Here, selection range 204 is included in sensor profile 60, and selection unit 70 acquires selection range 204 from sensor profile 60. In particular, selection unit 70 may acquire sensor profile 60 from the outside of driving support device 40 or may store sensor profile 60 inside driving support device 40. In the former case, sensor profile 60 is stored, for example, in storage 61 provided outside driving support device 40. In the latter case, sensor profile 60 is stored, for example, in memory unit 42 illustrated in FIG. 1. Note that a combination of a storage and driving support device 40 may be defined as a driving support system. Sensor profile 60 is information that includes a maximum detectable distance as a minimum constitutional unit. Note that a detectable angle, a minimum detectable distance caused because an object that is behind a vehicle body cannot be detected, detection resolution of, for example, a radar in a distance direction, resolution in an angular direction, and information for specifying one selection range among a plurality of selection ranges may be added to sensor profile 60.

Figure 5:
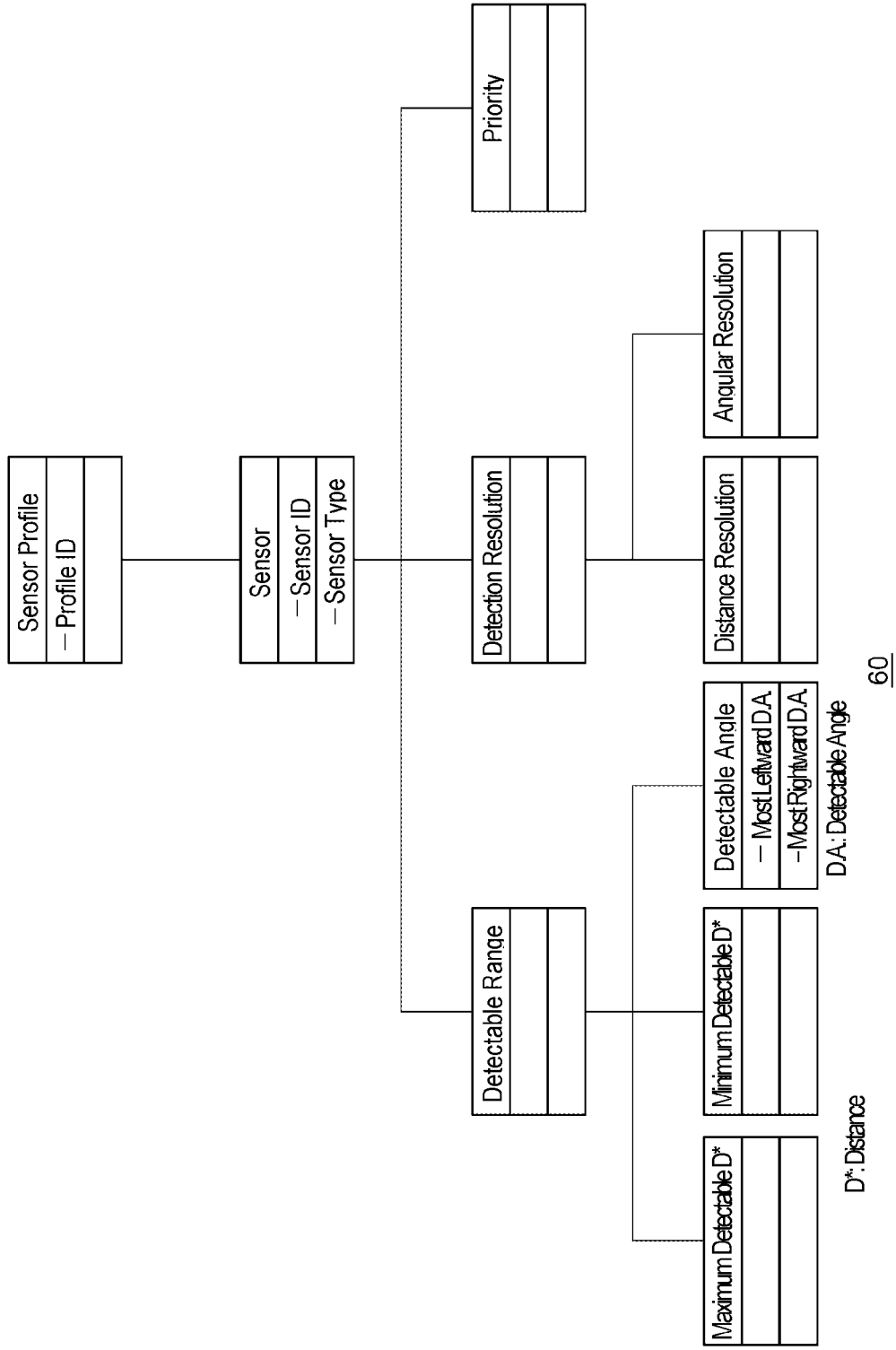
FIG. 5 is a diagram illustrating a data structure of a sensor profile acquired by the driving support device according to the first to fourth exemplary embodiments.

FIG. 5 illustrates a data structure of sensor profile 60 acquired by driving support device 40. In FIG. 5, at least one sensor profile 60 has a profile ID, as attribution information, for identifying sensor profiles from one another. One sensor profile 60 has at least one piece of sensor information. One piece of the sensor information may contain a sensor ID for identifying a sensor and information on sensor type such as a stereo camera, a single lens camera, a millimeter-wave radar, LIDAR, and a sonar. Furthermore, the sensor information contains, as constituents, at least one piece of detection range information, at least zero pieces of detection resolution information, and one piece of priority information. One piece of the detection range information contains, as constituents, at least one piece of maximum detectable distance information, and may contain minimum detectable distance information and detectable angle information. One piece of detectable angle information contains, as constituents, most leftward detectable angle information and most rightward detectable angle information. One piece of detectable resolution information may contain, as constituents, distance resolution information and angular resolution information. The priority information can specify what is placed at the highest priority among a plurality of sensors, the range information, and the resolution information.

Note that the configuration of sensor profile 60 is not limited to the above-mentioned configuration. Sensor profile 60 may be structured of multiple levels including an abstraction level. A plurality of sensor profiles 60 may be stored in different sensor configurations. Alternatively, for the purpose of increasing applicable types of vehicles by further limiting selection range 204, a plurality of sensor profiles 60 may be stored in the same sensor configuration. Note that different sensor configurations are shown in third and fourth exemplary embodiments, for example. Furthermore, different sensor profiles 60 may be stored for different detection targets, such as a pedestrian, a vehicle, and a two-wheeled vehicle. In this case, detection target information may be contained as an attribute of sensor profile 60, or detection target information can be identified by referring to a sensor profile ID. The description will return referring to FIG. 3A.

Figure 6A:
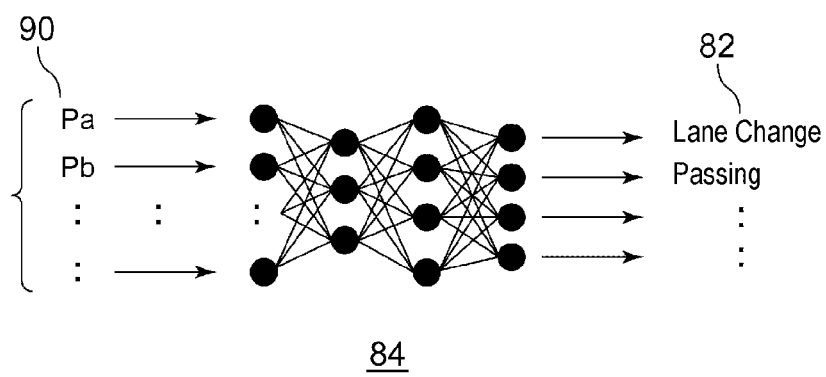
FIG. 6A and FIG. 6B are diagrams illustrating outlines of processing in a processing unit according to the first to fourth exemplary embodiments.

Learning unit 80 receives a running state, that is, the detection result selected in selection unit 70, as input parameter 90 (refer to FIG. 6A). Furthermore, learning unit 80 acquires a driving behavior related to the running state as supervised data 82. Learning unit 80 executes processing based on input parameter 90, specifically, executes the learning processing for training driving behavior model 84. Specifically, learning unit 80 adjusts driving behavior model 84 by using the running state as input parameter 90 and supervised data 82. In other words, by inputting input parameter 90 to a neural network, learning unit 80 adjusts, for example, a weight parameter for the neural network so as to obtain supervised data 82 as output. With this adjustment, learning unit 80 causes the neural network to learn a relationship between input parameter 90 and supervised data 82. As a result, driving behavior model 84 is constructed.

Figure 6B:
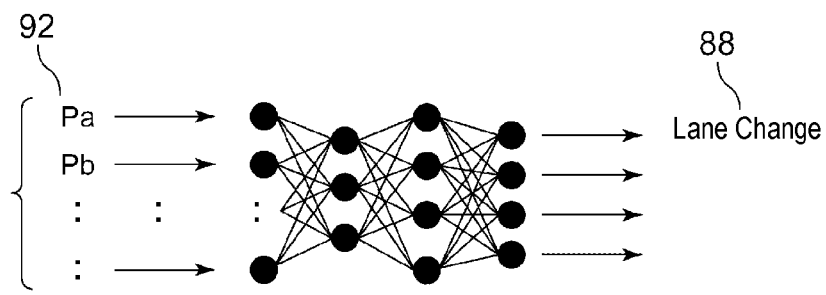

FIG. 6A and FIG. 6B illustrate the outlines of processing in processing unit 72. FIG. 6A illustrates the outline of the learning processing in learning unit 80. Learning unit 80 inputs, to the neural network, a plurality of input parameters 90 including parameters Pa and Pb each representing a running state, for example. Learning unit 80 optimizes the weight parameter for the neural network so that output from the neural network agrees with supervised data 82 related to input parameter 90. The thus-constructed neural network is driving behavior model 84. A description of FIG. 6B will be made later.

Next, the estimation processing is described referring to FIG. 3B. In FIG. 3B, control unit 41 includes selection unit 70 and processing unit 72, and processing unit 72 includes driving behavior model 84, estimation unit 86, and estimated value 88. Sensor 22 is connected to detected-information input unit 52, and detected-information input unit 52 is connected to selection unit 70. Note that vehicle 100 mounted with sensor 22 and driving support device 40 in FIG. 3B may be the same as or may be different from vehicle 100 mounted with sensor 22 and driving support device 40 in FIG. 3A. In the latter case, detectable range 200 and performance specification range 202 of sensor 22 in FIG. 3B may be different from detectable range 200 and performance specification range 202 of sensor 22 in FIG. 3A. Detection by sensor 22 in this case is now described referring to FIG. 7A and FIG. 7B.

Figure 7B:
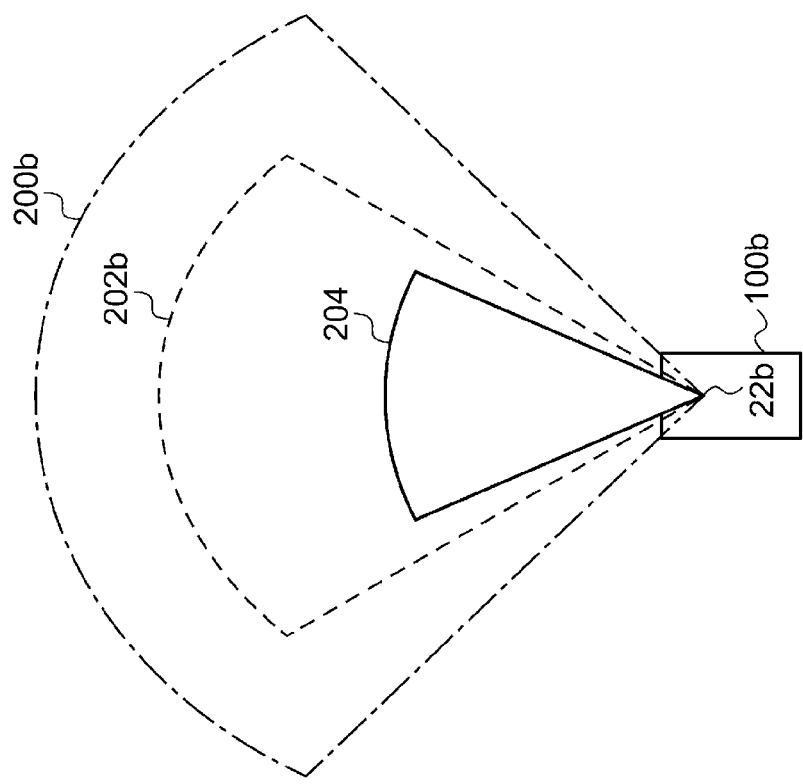
FIG. 7A and FIG. 7B are diagrams illustrating other outlines of detection by the sensor according to the first to fourth exemplary embodiments.
Figure 7A:
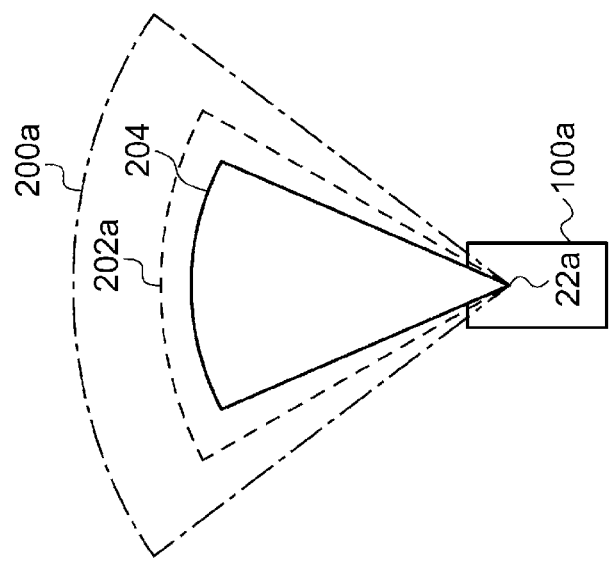

FIG. 7A and FIG. 7B illustrate other outlines of the detection by sensor 22. FIG. 7A illustrates first vehicle 100a mounted with sensor 22 and driving support device 40 in FIG. 3A. Here, sensor 22 denotes first sensor 22a. FIG. 7B illustrates second vehicle 100b mounted with sensor 22 and driving support device 40 in FIG. 3B. Here, sensor 22 denotes second sensor 22b. To make a description clear, it is assumed that first sensor 22a and second sensor 22b are of the same kind, for example, a camera. On the other hand, first detectable range 200a and first performance specification range 202a of first sensor 22a differ from second detectable range 200b and second performance specification range 202b of second sensor 22b, respectively. However, selection ranges 204 in FIG. 7A and FIG. 7B are set to be the same as each other. With such settings, vehicle 100 for executing the learning processing and vehicle 100 for executing the estimation processing can share the same estimation processing, even in cases where the vehicles are the same or different. The description will return referring to FIG. 3B.

Different selection ranges 204 may be set for different driving behaviors or different driving behavior subsets. For example, for a driving behavior subset, that is, a sudden braking applied within 1.5 sec time-to-collision (TTC), a selection range is preferable in which a value obtained by multiplying a speed at the time of the breaking by the TTC or a value obtained by adding a predetermined margin of distance to the thus-calculated value is taken as a detectable distance. Such selection range 204 is also included in sensor profile 60.

Since sensor 22, detected-information input unit 52, and selection unit 70 execute the same processing as that in FIG. 3A, descriptions thereof are omitted here. Selection unit 70 outputs the selected detection result to estimation unit 86. Estimation unit 86 receives a running state, that is, the detection result selected in selection unit 70, as input parameter 92. Estimation unit 86 executes processing based on input data 92, specifically executes estimation processing for estimating a driving behavior. Specifically, estimation unit 86 inputs input data 92 to driving behavior model 84 and acquires estimated value 88 from driving behavior model 84. Estimated value 88 is a driving behavior.

FIG. 6B illustrates the outline of estimation processing in estimation unit 86. Estimation unit 86 inputs input data 92 indicating a running state to a neural network. With this operation, estimation unit 86 acquires, as estimated value 88, a driving behavior output from the neural network, for example, lane changing. Based on the driving behavior acquired in estimation unit 86, automatic driving controller 30 in FIG. 1 controls automatic driving of vehicle 100.

The operation of driving support device 40 having the above-described configuration is now described. FIG. 8 is a flowchart illustrating a procedure of learning by driving support device 40. Detected information is input to detected-information input unit 52 (S10). If a detection result falls within selection range 204 (Y at S12), selection unit 70 selects the detection result (S14). In contrast, if a detection result does not fall within selection range 204 (N at S12), S14 is skipped. Learning unit 80 executes learning processing by using the selected detection result as input parameter 90 (S16).

FIG. 9 is a flowchart illustrating a procedure of estimation by driving support device 40. Detected information is input to detected-information input unit 52 (S50). If a detection result falls within selection range 204 (Y at S52), selection unit 70 selects the detection result (S54). In contrast, if a detection result does not fall within selection range 204 (N at S52), S54 is skipped. Estimation unit 86 executes estimation processing by using the selected detection result as input data 92 (S56).

According to the present embodiment, a detection result that falls within a predetermined selection range narrower than the performance specification range of a sensor is selected, and such a detection result is used for processing, and thus, the influence of a decrease in the detection accuracy of the sensor can be reduced. Furthermore, since such a selected detection result is used for the learning processing, the accuracy of a driving behavior model thus constructed can be improved. Furthermore, since such a selected detection result is used for the estimation processing, accuracy in driving behavior estimation can be improved. Furthermore, since a detection result in which the influence of a decrease in the detection accuracy of a sensor is reduced is used, accuracy in automatic driving control can be improved.

Second Exemplary Embodiment

Next, a second exemplary embodiment is described. As is the case in the first exemplary embodiment, the second exemplary embodiment relates to a driving support device that executes at least one of learning processing and estimation processing. The driving support device in the first exemplary embodiment reduces the influence of a decrease in the detection accuracy of a sensor by selecting a detection result that falls within a selection range. However, depending on the shape of a road, a portion outside the road may be included in the selection range. Generally, even when an obstacle is present in a portion outside a road, such obstacle does not affect driving behavior, and therefore the obstacle in the portion outside the road does not need to be detected. If such obstacle is detected, there is a possibility that the detection causes a decrease in learning accuracy or estimation accuracy. To prevent this decrease, the selection range is limited using map information in the second exemplary embodiment. The configuration of vehicle 100 according to the second exemplary embodiment is the same as that in FIG. 1 and FIG. 2. Here, differences from the first exemplary embodiment are mainly described.

Figure 10A:
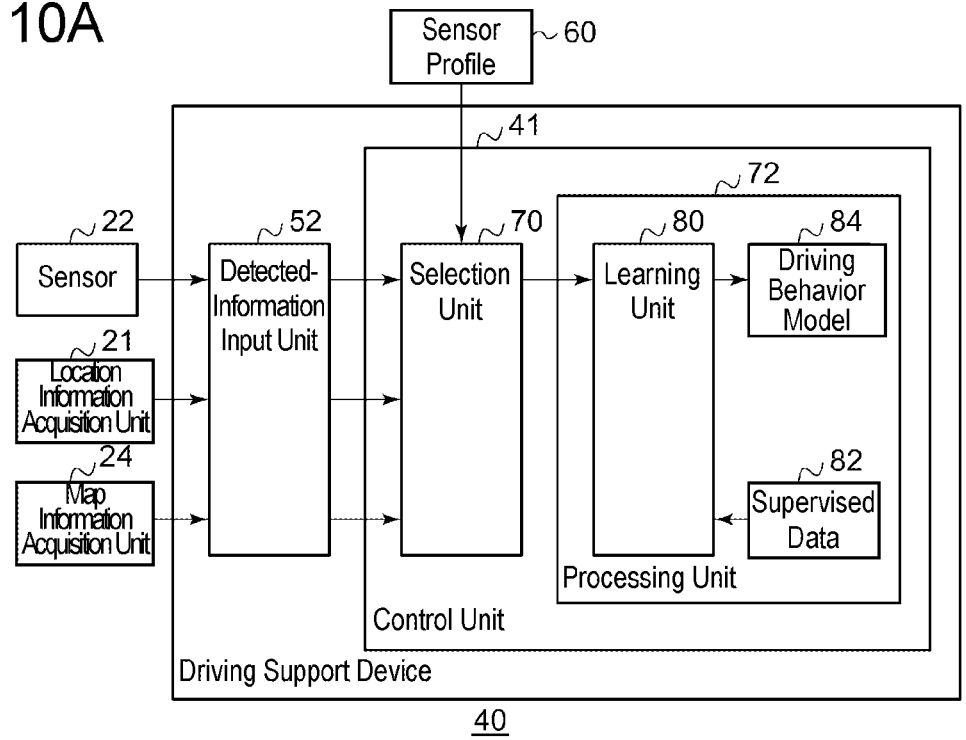
FIG. 10A and FIG. 10B are diagrams illustrating configurations of a driving support device according to the second exemplary embodiment.
Figure 10B:
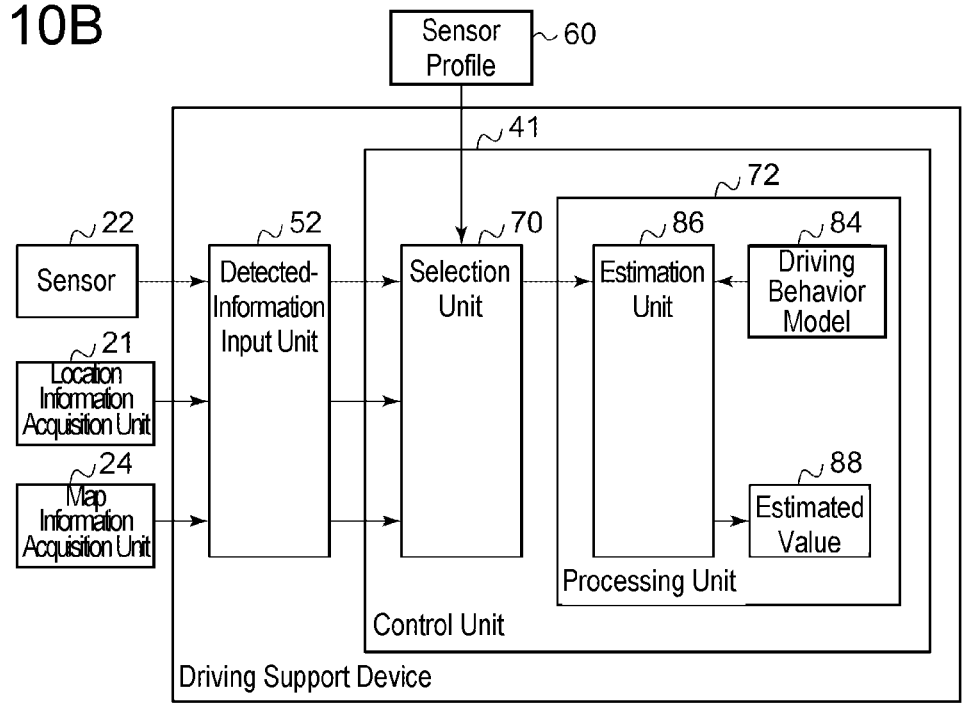

FIG. 10A and FIG. 10B illustrate configurations of driving support device 40. FIG. 10A illustrates a configuration related to learning processing, and FIG. 10B illustrates a configuration related to estimation processing. Here, the learning processing is described first, and subsequently, the estimation processing is described. In FIG. 10A, location information acquisition unit 21 and map information acquisition unit 24 are added to the configuration illustrated in FIG. 3A. To detected-information input unit 52, detected information from sensor 22, location information from location information acquisition unit 21, and map information from map information acquisition unit 24 are input. Detected-information input unit 52 outputs the detected information, the location information, and the map information to selection unit 70.

Selection unit 70 receives the detected information, the location information, and the map information from detected-information input unit 52. Selection unit 70 identifies the shape of a road on which the vehicle is presently running by referring to the map information according to the location information. Note that geographical information included in the map information may be directly used. For example, the shape of a road is identified as a straight road or a leftward curved road. Meanwhile, selection unit 70 acquires a selection range from sensor profile 60, as described previously. Furthermore, selection unit 70 limits the selection range according to the shape of the road identified from the map information.

FIG. 11A and FIG. 11B illustrate the outline of detection by sensor 22. In FIG. 11A and FIG. 11B, vehicle 100, sensor 22, detectable range 200, performance specification range 202, and selection range 204 are illustrated in the same manner as in FIG. 4. In FIG. 11A, the shape of a road is identified as straight line road 300. Selection unit 70 derives first limited selection range 206a by limiting selection range 204 by straight road 300. In contrast, in FIG. 11B, the shape of a road is identified as curved road 302. Selection unit 70 derives second limited selection range 206b by limiting selection range 204 by curved road 302. Hereinafter, first limited selection range 206a and second limited selection range 206b are collectively referred to as limited selection range 206. The description will return referring to FIG. 10A.

Selection unit 70 determines whether or not a location indicated by a distance and a direction in a detection result falls within limited selection range 206. Selection unit 70 selects a detection result that falls within limited selection range 206. Selection unit 70 outputs the selected detection result to learning unit 80. Since processing in learning unit 80 is the same as that described above, a description thereof is omitted here.

Next, estimation processing is described referring to FIG. 10B. In FIG. 10B, location information acquisition unit 21 and map information acquisition unit 24 are added to the configuration illustrated in FIG. 3B. Since processing in selection unit 70 performed in the case where location information acquisition unit 21 and map information acquisition unit 24 are added is the same as that in FIG. 10A, a description thereof is omitted here. Furthermore, since processing in estimation unit 86 is the same as that described previously, a description thereof is omitted here.

According to the present embodiment, map information is used, whereby, an area, within the selection range, that does not need to become subject to detection can be excluded. Furthermore, since an area, within the selection range, that does not need to become subject to detection is excluded, the influence of a decrease in the detection accuracy of the sensor can be reduced. Furthermore, since the influence of a decrease in the detection accuracy of the sensor is reduced, learning accuracy can be improved. Furthermore, since the influence of a decrease in the detection accuracy of the sensor is reduced, estimation accuracy can be improved.

Third Exemplary Embodiment

Next, a third exemplary embodiment is described. As is the case in the above-described embodiments, the third exemplary embodiment relates to a driving support device that executes at least one of learning processing and estimation processing. The driving support device in the first exemplary embodiment reduces the influence of a decrease in the detection accuracy of a sensor by selecting a detection result that falls within a selection range. Generally, a plurality of types of sensors, such as a camera, a millimeter-wave radar, and LIDAR, is mounted to a vehicle, and hence, using detection results in these sensors, at least one of learning processing and estimation processing should be executed. However, different types of sensors have greatly different detectable ranges, performance specification ranges, and selection ranges. In the third exemplary embodiment, it is an object to reduce the influence of a decrease in the detection accuracy of the sensors even in the case where a plurality of types of sensors is mounted to a vehicle. The configuration of vehicle 100 according to the third exemplary embodiment is the same as that in FIG. 1 and FIG. 2. Here, differences from the above-described embodiments are mainly described.

Figure 12A:
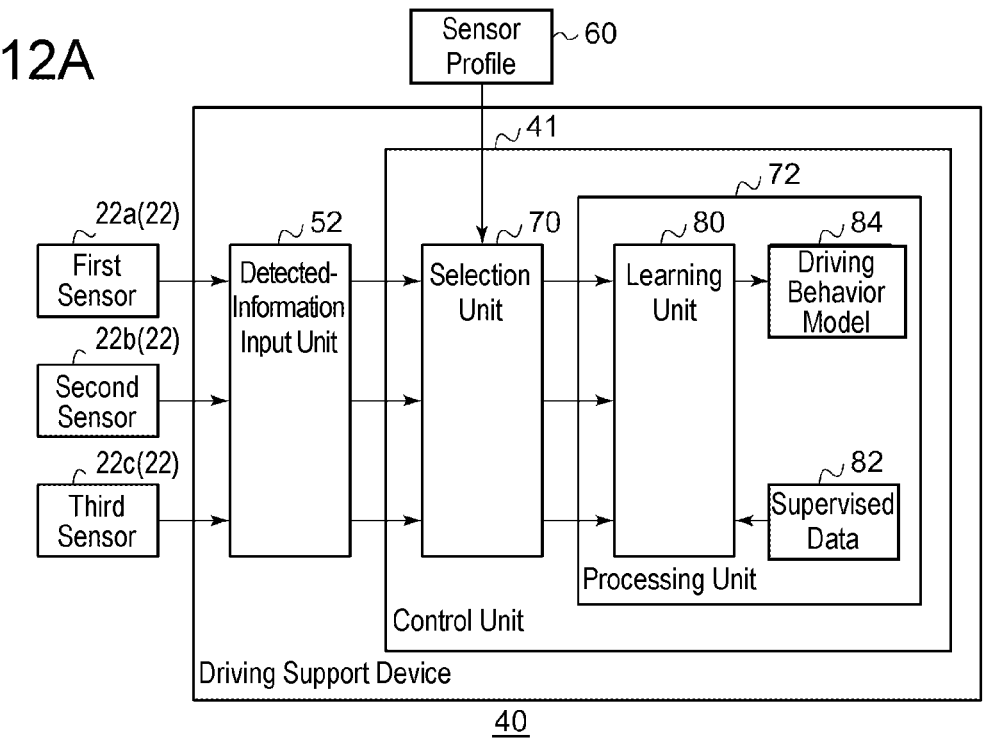
FIG. 12A and FIG. 12B are diagrams illustrating configurations of a driving support device according to the third exemplary embodiment.
Figure 12B:
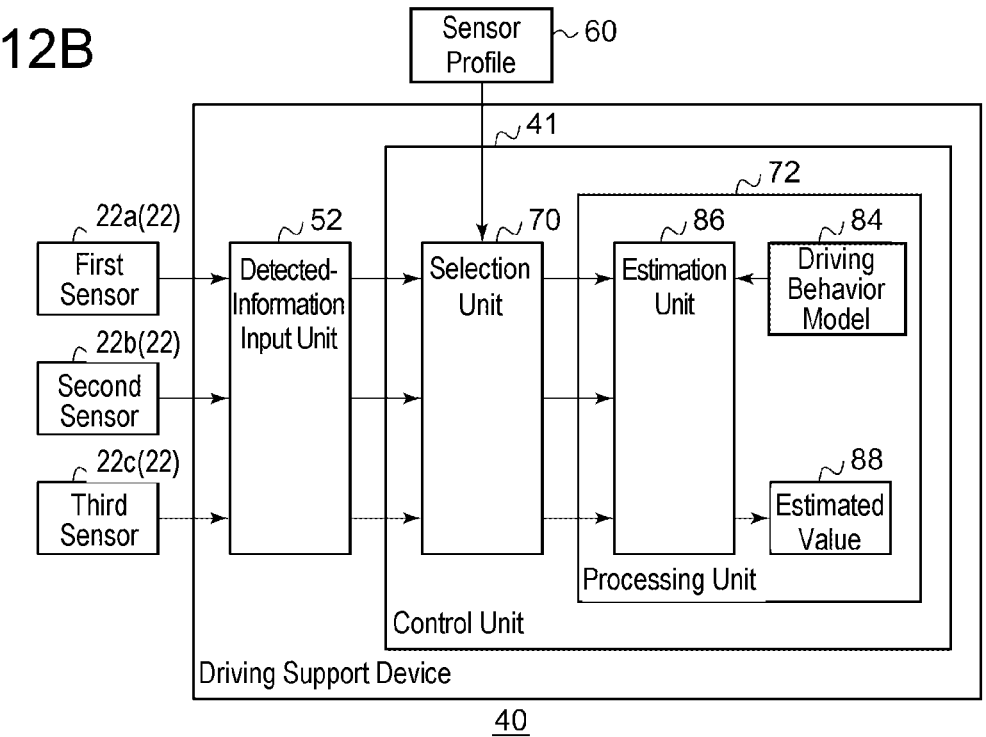

FIG. 12A and FIG. 12B illustrate configurations of driving support device 40. FIG. 12A illustrates a configuration related to learning processing, and FIG. 12B illustrates a configuration related to estimation processing. Here, the learning processing is described first, and subsequently, the estimation processing is described. In FIG. 12A, instead of sensor 22 in the configuration illustrated in FIG. 3A, first sensor 22a, second sensor 22b, and third sensor 22c are added. First sensor 22a, second sensor 22b, and third sensor 22c differ in type from each other. For example, first sensor 22a is a camera, second sensor 22b is a millimeter-wave radar, and third sensor 22c is a LIDAR. Note that the types of sensors 22 mounted to vehicle 100 are not limited to three types.

To detected-information input unit 52, detected information from each of a plurality of sensors 22 is input. As described above, the detected information includes detection results by respective sensors 22. Detected-information input unit 52 outputs the detected information from each of sensors 22 to selection unit 70. Selection unit 70 receives, from detected-information input unit 52, detected information from each of sensors 22. Selection unit 70 acquires selection ranges 204 of respective sensors 22 from sensor profile 60.

FIG. 13A and FIG. 13B illustrate the outlines of detection by first sensor 22a and second sensor 22b, respectively. FIG. 13A illustrates first detectable range 200a, first performance specification range 202a, and first selection range 204a of first sensor 22a. FIG. 13B illustrates second detectable range 200b, second performance specification range 202b, and second selection range 204b of second sensor 22b. First selection range 204a and second selection range 204b are collectively referred to as selection range 204, but are different from each other. The description will return referring to FIG. 12A.

Selection unit 70 makes a selection of a detection result according to selection range 204 for every sensor 22 at the same time. In other words, selection unit 70 selects a detection result in first sensor 22a that falls within first selection range 204a, and, at the same time, selects a detection result in second sensor 22b that falls within second selection range 204b. Selection unit 70 outputs the selected detection results to learning unit 80. Since processing in learning unit 80 is the same as that described above, a description thereof is omitted here. Note that learning unit 80 may collectively execute learning processing for the plurality of sensors 22 to output one driving behavior model 84. Alternatively, learning unit 80 may execute learning processing on a sensor-22-by-sensor-22 basis to output driving behavior model 84 for each sensor 22.

Next, estimation processing is described referring to FIG. 12B. In FIG. 12B, instead of sensor 22 in the configuration illustrated in FIG. 3B, first sensor 22a, second sensor 22b, and third sensor 22c are added. Since processing in selection unit 70 performed in the case where first sensor 22a, second sensor 22b, and third sensor 22c are added is the same as that in FIG. 12A, a description thereof is omitted here. Furthermore, since processing in estimation unit 86 is the same as that described previously, a description thereof is omitted here. Note that, in the case where one driving behavior model 84 is constructed, estimation unit 86 collectively executes estimation processing for the plurality of sensors 22, and in contrast, in the case where driving behavior model 84 is constructed for each sensor 22, estimation unit 86 executes estimation processing on a sensor-22-by-sensor-22 basis.

According to the present embodiment, a selection range is predetermined on a sensor-by-sensor basis and a detection result is selected, and thus, selection processing for a plurality of sensors can be executed at the same time. Furthermore, since selection processing for a plurality of sensors can be executed at the same time, even in the case of using a plurality of sensors, the influence of a decrease in the detection accuracy of the sensors can be reduced. Furthermore, since the influence of a decrease in the detection accuracy of the sensors is reduced, learning accuracy can be improved. Furthermore, since the influence of a decrease in the detection accuracy of the sensors is reduced, estimation accuracy can be improved.

Fourth Exemplary Embodiment

Next, a fourth exemplary embodiment is described. As is the case in the above-described embodiments, the fourth exemplary embodiment relates to a driving support device that executes at least one of learning processing and estimation processing. The driving support device in the first exemplary embodiment reduces the influence of a decrease in the detection accuracy of a sensor by selecting a detection result that falls within a selection range. In the fourth exemplary embodiment, sensor fusion is a target for processing. Sensor fusion is a technique to implement an advanced recognition function, which is not feasible with a single sensor, by executing integrated processing of many detection results obtained from a plurality of sensors, such as a camera and a millimeter-wave radar. Here, it is an object to reduce the influence of a decrease in the detection accuracy of the sensors even when sensor fusion is used. The configuration of vehicle 100 according to the fourth exemplary embodiment is the same as that in FIG. 1 and FIG. 2. Here, differences from the above-described embodiments are mainly described.

Figure 14A:
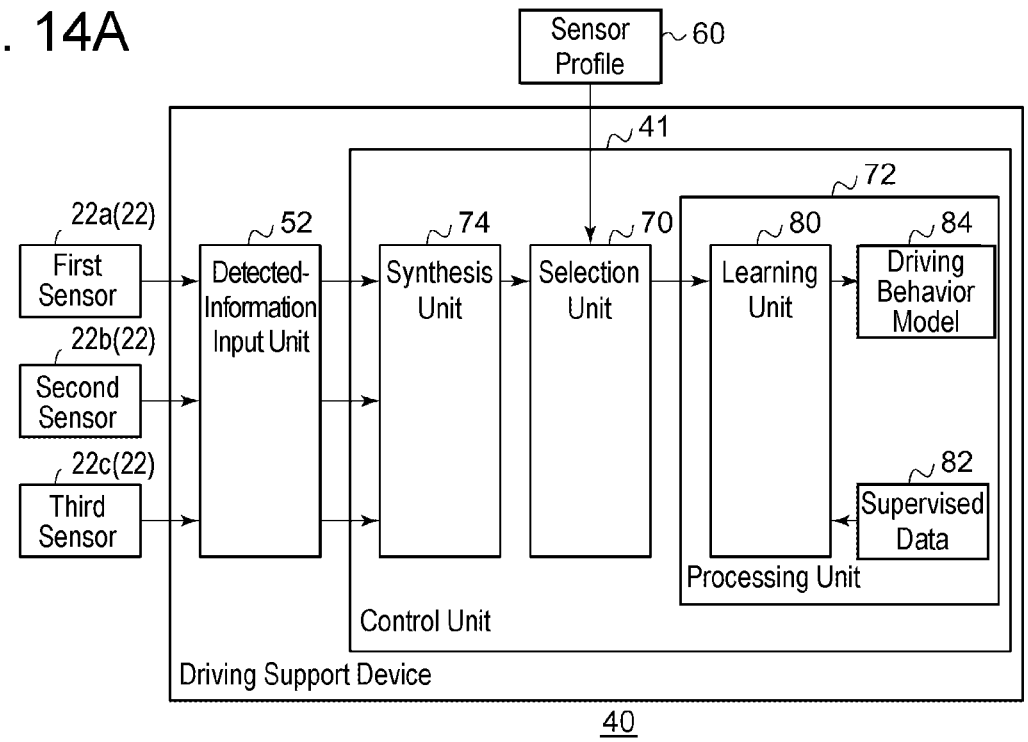
FIG. 14A and FIG. 14B are diagrams illustrating configurations of a driving support device according to the fourth exemplary embodiment.
Figure 14B:
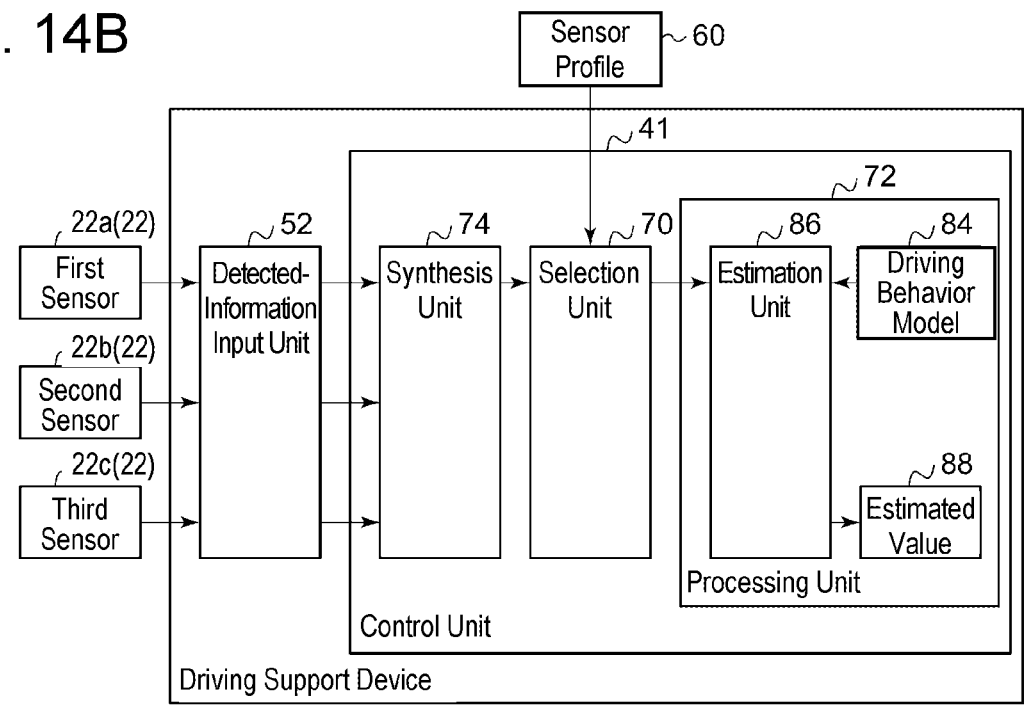

FIG. 14A and FIG. 14B illustrate configurations of driving support device 40. FIG. 14A illustrates a configuration related to learning processing, and FIG. 14B illustrates a configuration related to estimation processing. Here, the learning processing is described first, and subsequently, the estimation processing is described. In FIG. 14A, synthesis unit 74 is added to the configuration illustrated in FIG. 12A. Synthesis unit 74 receives detection results by respective sensors 22 from detected-information input unit 52. Synthesis unit 74 synthesizes the detection results from sensors 22. In other words, synthesis unit 74 prepares a sum set of the detection results by sensors 22 as a detection result. Synthesis processing in synthesis unit 74 corresponds to sensor fusion. For the synthesis processing, it is only required to use a well-known technique, and therefore, a description thereof is omitted here. Synthesis unit 74 outputs a synthesized detection result (hereinafter, also referred to as a "detection result") to selection unit 70.

Figure 15:
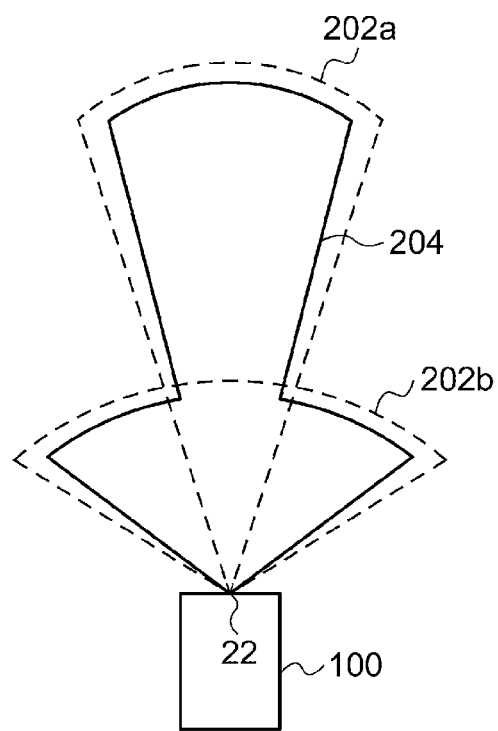
FIG. 15 is a diagram illustrating an outline of detection by a sensor according to the fourth exemplary embodiment.

Selection unit 70 receives a detection result from synthesis unit 74. Furthermore, selection unit 70 acquires a selection range for the detection result from sensor profile 60. FIG. 15 illustrates the outline of detection by sensor 22. Here, it is assumed that two types of sensors 22 are mounted to vehicle 100, but, FIG. 15 illustrates only one sensor 22 by which the two types of sensors 22 are collectively expressed. Here, performance specification range 202 of first sensor 22a shown in FIG. 14A is denoted as first performance specification range 202a, and performance specification range 202 of second sensor 22b is denoted as second performance specification range 202b. Selection range 204 is determined, based on a range obtained by preliminary synthesizing first performance specification range 202a and second performance specification range 202b (adding first performance specification range 202a to second performance specification range 202b). That is, selection range 204 is determined beforehand, based on a detectable range when synthesis unit 74 performs synthesis. In other words, selection unit 70 uses a sum range of the selection ranges of sensors 22a and 22b, as selection range 204 for the sum set of the detection results by sensors 22a and 22b. Sensor profile 60 also includes such selection range 204. Alternatively, selection unit 70 or other unit may generate such selection range 204 based on first performance specification range 202a and second performance specification range 202b. The description will return referring to FIG. 14A.

Selection unit 70 determines whether or not a location indicated by a distance and a direction in a detection result falls within selection range 204. Selection unit 70 selects a detection result that falls within selection range 204. Selection unit 70 outputs the selected detection result to learning unit 80. Since processing in learning unit 80 is the same as that described above, a description thereof is omitted here.

Next, estimation processing is described with reference to FIG. 14B. In FIG. 14B, synthesis unit 74 is added to the configuration illustrated in FIG. 12B. Since processing in selection unit 70 performed in the case where synthesis unit 74 is added is the same as that in FIG. 14A, a description thereof is omitted here. Furthermore, since processing in estimation unit 86 is the same as that described above, a description thereof is omitted here.

According to the present embodiment, a selection range is determined beforehand, based on a range obtained by synthesizing performance specification ranges of a plurality of sensors, and therefore, even in the case of using sensor fusion, a detection result can be selected by the selection range. Furthermore, since a detection result is selected by the selection range even in the case of using sensor fusion, the influence of a decrease in the detection accuracy of the sensors can be reduced. Furthermore, since the influence of a decrease in the detection accuracy of the sensors is reduced, learning accuracy can be improved. Furthermore, since the influence of a decrease in the detection accuracy of the sensors is reduced, estimation accuracy can be improved.

Hereinbefore, the embodiments according to the present disclosure are described in detail with reference to the drawings. The functions of the above-described devices and processing units are executed by a computer program. A computer for implementing the above-described functions by using a computer program includes: input devices such as a keyboard, a mouse, and a touchpad; output devices such as a display and a loudspeaker; a central processing unit (CPU); a ROM; a RAM; storages such as a hard disc drive and a solid state drive (SSD); a reader for reading information from recording media such as a digital versatile disk read only memory (DVD-ROM) and a USB memory; and a network card for making communication through a network, and these devices are connected via buses.

The reader reads the computer program from a non-temporary recording medium with a computer program recorded therein, and causes the storage to store the program. Alternatively, the network card communicates with a server connected to the network, and causes the storage to store the computer program, downloaded from the server, for implementing the functions of the above-mentioned devices. Furthermore, the CPU copies the computer program stored in the storage into the RAM, and sequentially reads commands included in the computer program from RAM and executes the commands, whereby the functions of the above-mentioned devices are implemented.

The outline of one aspect of the present disclosure is as follows. A data processor according to one aspect of the present disclosure is a data processor for executing processing for estimating a driving behavior of a vehicle by using a driving behavior model trained based on a detection result by a sensor. This data processor includes a detected-information input unit, a selection unit, and a processing unit. The detected-information input unit is configured to acquire detected information including detection results. From the detection results included in the detected information acquired by the detected-information input unit, the selection unit is configured to select a detection result that falls within a predetermined selection range narrower than a range detectable by the sensor. The processing unit is configured to execute processing, based on the detection result selected by the selection unit.

According to this aspect, since the detection result that falls within the predetermined selection range narrower than the range detectable by the sensor is selected and used for processing, the influence of a decrease in the detection accuracy of the sensor can be reduced.

The selection unit may acquire the selection range from a sensor profile. In this case, the selection unit uses the sensor profile, whereby the selection range can be set in the selection unit.

The selection unit may acquire the sensor profile from the outside of the data processor. In this case, a plurality of data processors can share the sensor profile.

The selection unit may store the sensor profile internally in the data processor. In this case, a simpler configuration is achieved.

The sensor profile acquired by the selection unit includes at least distance information. Since the distance information is included, a detection result can be selected using the distance information.

The selection unit may limit the selection range, based on map information. In this case, an area that does not need to become subject to detection is excluded, and therefore, the influence of a decrease in the detection accuracy of the sensor can be reduced.

When detected information by respective sensors that includes detection results in the sensor is input to the detected-information input unit, the selection unit may select a detection result that falls within a selection range of each of the sensors, on a sensor-by-sensor basis. In this case, a selection range is determined beforehand for each sensor to select the detection result, and therefore, even in the case of using the plurality of sensors, the influence of a decrease in the detection accuracy of the sensors can be reduced.

When detected information by respective sensors that includes detection results in the sensor is input to the detected-information input unit, the data processor may further include a synthesis unit configured to synthesize detection results by the sensors. In this case, the synthesis unit prepares a sum set of the detection results by the sensors. The selection unit may use a range determined by preliminary adding the selection ranges for the sensors as a selection range for the sum set. Therefore, even in the case of using sensor fusion, the influence of a decrease in the detection accuracy of the sensors can be reduced.

The processing in the processing unit may be learning processing for training a driving behavior model. In this case, the processing unit may use the detection result selected in the selection unit as an input parameter, and construct the driving behavior model by using the input parameter and supervised data. According to this case, since the selected detection result is used for the learning processing, learning accuracy can be improved.

The processing in the processing unit may be estimation processing for estimating a driving behavior. In this case, the processing unit may input the detection result selected in the selection unit as input data to a driving behavior model and acquire output from the driving behavior model as the driving behavior. In this case, since the selected detection result is used for the estimation processing, estimation accuracy can be improved.

The processing in the processing unit may include learning processing for training a driving behavior model and estimation processing for estimating a driving behavior. In this case, when executing the learning processing, the processing unit may use the detection result selected in the selection unit as an input parameter, and construct the driving behavior model by using the input parameter and supervised data. On the other hand, when executing the estimation processing, the processing unit may input the detection result selected in the selection unit as input data to the driving behavior model and acquire output from the driving behavior model as the driving behavior. In this case, since the selected detection result is used for the learning processing and the estimation processing, learning accuracy and estimation accuracy can be improved.

Another aspect of the present disclosure is a driving support method. According to this method, processing for estimating a driving behavior of a vehicle is executed by using a driving behavior model trained based on a detection result by a sensor. In this method, detected information including detection results is input to a computer. Subsequently, from the detection results included in the input detected information, a detection result that falls within a predetermined selection range narrower than a range detectable by the sensor is selected. Furthermore, based on the selected detection result, processing is executed.

Another aspect of the present disclosure is a non-temporary recording medium with a computer program stored therein for executing processing for estimating a driving behavior of a vehicle by using a driving behavior model trained based on a detection result by a sensor. The stored computer program causes a computer to execute the following processing. In a first processing, detected information including detection results is acquired. In a second processing, a detection result is selected from the detection results included in the acquired detected information. The selected detection result falls within a predetermined selection range narrower than a range detectable by the sensor. In a third processing, the processing is executed based on the selected detection result.

Further another aspect of the present disclosure is a driving support system. This driving support system includes a storage configured to store a sensor profile, and a data processor. The data processor acquires a sensor profile from the storage, and executes processing for estimating a driving behavior of a vehicle by using a driving behavior model trained based on a detection result by a sensor. The data processor is configured as described above. The selection unit of the data processor acquires a selection range from the sensor profile.

Hereinbefore, the present disclosure is described based on the embodiments. These embodiments are intended to be illustrative only, and it will be obvious to those skilled in the art that various modifications to a combination of constituents or processes could be developed and such modifications also fall within the scope of the present disclosure.

In the first to fourth exemplary embodiments, processing unit 72 includes learning unit 80 or estimation unit 86. However, the present disclosure is not limited to this. For example, processing unit 72 may include learning unit 80 and estimation unit 86. In this case, processing unit 72 executes the learning processing and the estimation processing. According to the present modification, a selected detection result is used for the learning processing and the estimation processing, and accordingly, learning accuracy and estimation accuracy can be improved.

What is claimed is:

1. A data processing device that estimates a driving behavior of a vehicle by using a driving behavior model, the driving behavior model indicating a relationship between a running state of the vehicle and the driving behavior, the driving behavior model being constructed based on a plurality of detection results indicating information about a plurality of objects which are outside of the vehicle and are detected by a sensor on the vehicle, the data processing device comprising:
   a processor; and
   a memory coupled to the processor, the memory storing a program that, when executed by the processor, causes the data processing device to:
   acquire detected information including the detection results and indicating the running state of the vehicle or one or more conditions;
   limit a predetermined selection range narrower than a range detectable by the sensor based on map information;
   select, from the detection results included in the detected information acquired, one of the detection results that falls within the selection range; and
   perform processing based on the one of the detection results selected.

2. The data processing device according to claim 1, wherein the sensor is one of a plurality of sensors, and wherein the program, when executed by the processor, causes the data processing device to:
   acquire detected information from each of the plurality of sensors, the detected information including detection results of each of the plurality of sensors, and
   select at least two of the detection results including one of the detection results of each of the plurality of sensors that is within the selection range.

3. The data processing device according to claim 1,
wherein the sensor is one of a plurality of sensors, and selection ranges including the selection range are predetermined for the plurality of sensors, respectively,
wherein the program, when executed by the processor, causes the data processing device to:
acquire detected information from each of the plurality of sensors, the detected information including detection results in each of the plurality of sensors,
make a sum set of the detection results by the plurality of sensors, and
use a sum range of the selection ranges, as the selection range.

4. The data processing device according to claim 1,
wherein the processing is learning processing that trains the driving behavior model, and
wherein the program, when executed by the processor, causes the data processing device to construct the driving behavior model by using an input parameter and supervised data indicating the driving behavior related to the running state, the input parameter being the one of the detection results selected and the supervised data.

5. The data processing device according to claim 1,
wherein the processing is estimation processing that estimates the driving behavior, and
wherein the program, when executed by the processor, causes the data processing device to input the one of the detection results selected as input data to the driving behavior model, and acquire output from the driving behavior model as the driving behavior.

6. The data processing device according to claim 1,
wherein the processing includes learning processing that trains the driving behavior model and estimation processing that estimates the driving behavior, and
wherein the program, when executed by the processor, causes the data processing device to:
when executing the learning processing, use the one of the detection results selected as an input parameter and construct the driving behavior model by using the input parameter and supervised data indicating the driving behavior related to the running state, and
when executing the estimation processing, input the one of the detection results selected as input data to the driving behavior model, and acquire output from the driving behavior model as the driving behavior.

7. The data processing device according to claim 1, wherein the detection results indicate a distance to each of the objects detected by the sensor and a direction of the each of the objects by using the sensor as a starting point.

8. The data processing device according to claim 1, wherein the processing based on the one of the detection results selected does not use the detection results other than the one of the detection results selected.

9. The data processing device according to claim 1, wherein the program, when executed by the processor, causes the data processing device to acquire the selection range from a sensor profile.

10. The data processing device according to claim 9, wherein the program, when executed by the processor, causes the data processing device to acquire the sensor profile from a storage device that is external to the data processing device.

11. The data processing device according to claim 9, wherein the program, when executed by the processor, causes the data processing device to:
store the sensor profile, and
acquire the sensor profile from within the data processing device.

12. The data processing device according to claim 9, wherein the sensor profile acquired includes distance information.

13. A driving support method that estimates a driving behavior of a vehicle by using a driving behavior model, the driving behavior model indicating a relationship between a running state of the vehicle and the driving behavior, the driving behavior model being constructed based on a plurality of detection results indicating information about a plurality of objects which are outside of the vehicle and are detected by a sensor included on the vehicle, the driving support method comprising:
inputting, to a computer, detected information including the detection results and indicating the running state of the vehicle or one or more conditions;
limiting a predetermined selection range narrower than a range detectable by the sensor based on map information;
selecting, from the detection results included in the input detected information, one of the detection results that falls within the selection range; and
performing processing based on the selected one of the detection results.

14. The driving support method according to claim 13, wherein the processing based on the selected one of the detection results does not use the detection results other than the selected one of the detection results.

15. A driving support system, comprising:
a storage device which, in operation, stores a sensor profile; and
a data processing device that includes:
a processor; and
a memory coupled to the processor, the memory storing a program that, when executed by the processor, causes the data processing device to:
acquire a selection range from the sensor profile, the selection range being narrower than a range detectable by the sensor;
limit the selection range based on map information;
estimate a driving behavior of a vehicle by using a driving behavior model, the driving behavior model indicating a relationship between a running state of the vehicle and the driving behavior, the behavior model being constructed based on a plurality of detection results indicating information about a plurality of objects which are outside of the vehicle and are detected by a sensor included on the vehicle
acquire detected information including the detection results and indicating the running state of the vehicle or one or more conditions;
select, from the detection results included in the detected information acquired, one of the detection results that falls within the selection range; and
perform processing based on the one of the detection results selected, and
wherein the storage device is external to the data processing device.

16. The driving support system according to claim 15, wherein the processing based on the one of the detection results selected does not use the detection results other than the one of the detection results selected.

* * * * *